(12) United States Patent
Lundgren

(10) Patent No.: US 6,641,012 B1
(45) Date of Patent: Nov. 4, 2003

(54) ARRANGEMENT IN A LOAD CARRIER FOOT

(75) Inventor: Anders Lundgren, Grimsås (SE)

(73) Assignee: Thule Sweden AB, Hillerstop (SE)

( * ) Notice: Subject to any disclaimer, the term of this patent is extended or adjusted under 35 U.S.C. 154(b) by 0 days.

(21) Appl. No.: 09/519,817

(22) Filed: Mar. 6, 2000

Related U.S. Application Data

(63) Continuation of application No. 08/737,400, filed as application No. PCT/SE95/00528 on May 12, 1995, now abandoned.

(30) Foreign Application Priority Data

May 25, 1994 (SE) ................................................ 9401790

(51) Int. Cl.$^7$ ................................................ B60R 9/04
(52) U.S. Cl. ........................ 224/331; 224/515; 224/558
(58) Field of Search ................................ 224/323, 327, 224/329, 330, 331, 515, 547, 555–8, 321, 322

(56) References Cited

U.S. PATENT DOCUMENTS

| | | | |
|---|---|---|---|
| 4,496,089 A | * 1/1985 | Eklund | .......................... 224/329 |
| 4,809,943 A | * 3/1989 | Taschero | ................. 224/329 X |
| 4,993,615 A | * 2/1991 | Arvidsson | ................ 224/329 X |
| 5,280,870 A | * 1/1994 | Chick et al. | ............ 224/556 X |
| 5,366,125 A | * 11/1994 | Grim | ........................... 224/330 |

FOREIGN PATENT DOCUMENTS

| | | | |
|---|---|---|---|
| EP | 0609152 | * 8/1994 | .................. 224/330 |

* cited by examiner

Primary Examiner—Renee Luebke

(74) Attorney, Agent, or Firm—Howrey Simon Arnold & White LLP

(57) ABSTRACT

A load carrier foot adapted for releasable securement upon an edge portion of a vehicle roof. The load carrier foot includes a support member for abutment against a vehicle roof. A clamping member is coupled to the support member by a retainer member and the clamping member is operable between a clamping configuration and a released configuration upon an edge portion of a vehicle roof. The clamping member has a first connection piece and the retainer member has a second connection piece for interconnecting the clamping member and the retainer member. One of the connection pieces forms an insertion space and the other of the connection pieces forms an insertion member for insertion into the insertion space. A latching device releasably latches the insertion member within the insertion space for facilitating the installation of different clamping members into the load carrier foot. The latching device is adapted for snapping engagement into a latching position for coupling together the retainer member and the clamping member. The latching device also includes a latching pin upon which the clamping member is pivotable relative to the retainer member. The retainer member has a substantially C-shaped cross sectional shape interiorly defining the insertion space and the first connection piece of the clamping member is insertable longitudinally within the insertion space for relative longitudinal movement between the retainer member and the clamping member until the latching device is engaged to prevent the relative longitudinal movement.

7 Claims, 2 Drawing Sheets

ARRANGEMENT IN A LOAD CARRIER FOOT

This application is a continuation of application Ser. No. 08/737,400 filed Nov. 8, 1996 and now abandoned, which is a 371 of international application number PCT/SE95/00528 filed May 12, 1995.

TECHNICAL FIELD

The present invention relates to an arrangement in a load carrier foot of the type that is employed for securing a load carrier strut to opposite edge portions of a vehicle roof and comprises a support portion for abutment against the vehicle roof, a clamping member which is designed, by engagement with the vehicle and under the action of a damping device, to clamp the load carrier strut and its feet fast to the vehicle, the clamping member being replaceable for adaptation to different vehicle models.

BACKGROUND ART

Arrangements of the type intimated by way of introduction are previously known in uncountable different designs. In these prior art constructions, it is common that the clamping member—which is thus specifically designed in response to the shape of the vehicle body—has an upper portion which cooperates with components disposed interiorly in the load carrier foot and which may thereby be deemed to form part, with the upper portion, of that clamping mechanism with which the load carrier foot is provided for its fastening on the vehicle body. As a result, the clamping member becomes a complicated and expensive component which cannot readily be mounted in the load carrier foot when the load carrier is to be adapted to a specific vehicle body. As a rule, a more or less extensive dismantling of the entire load carrier foot and its clamping mechanism is required before the clamping member can be mounted in place.

In a corresponding manner, extensive intervention into the load carrier foot is required if the clamping member is to be replaced and substituted by another, for example in connection with moving the load carrier from one vehicle type or model to another.

A further problem from which many prior art load carrier feet suffer is the inability of the clamping member to adjust in response to the shape of the vehicle body, where the major part of this adjustment entails that the clamping member is rotated about an axis of rotation which is transverse in relation to the vehicle. Given that the optimum position of rotation of the clamping member is often dependent upon the placing of the load carrier in the longitudinal direction along the vehicle, many prior art designs and constructions entail a less reliable securement, with the risk of damage not only to the vehicle but also to the clamping member itself as a result of oblique loading.

SUMMARY OF THE INVENTION

The present invention has for its object to design the arrangement intimated by way of introduction such that the clamping member, without dismantling of the load carrier foot or its clamping mechanism, may simply be mounted and dismounted, in principle by a single manual operation. The present invention further has for its object to realize an arrangement which permits a limited pivoting between the clamping member and the load carrier foot about a pivot axis which is transversely directed in relation to the longitudinal axis of the vehicle. The present invention further has for its object to realize an arrangement which is simple and economical in manufacture and which in addition affords extremely reliable function.

The objects forming the basis of the present invention will be attained if the arrangement intimated by way of introduction is characterized in that the load carrier foot includes a retainer portion which is included in or operable by the clamping device, that the retainer portion and the clamping device have connection pieces for interconnection with one another, and that the clamping member is secured in position interconnected with the retainer portion by means of a latch device.

These characterizing features afford the major advantage that the clamping member may readily be mounted and dismounted in the load carrier foot.

The present invention is further suitably characterized in that the clamping member includes a latch pin about which the clamping member is restrictedly pivotal in relation to the retainer portion.

These characterizing features afford the major advantage that the clamping member is self-adjusting to the correct position in response to the configuration of the vehicle body when the clamping member is tightened.

Further advantages will be attained according to the present invention if the subject matter as disclosed herein is also given one or more of the characterizing features as set forth in appended claims 2 to 5 and 7.

BRIEF DESCRIPTION OF THE DRAWINGS

The present invention will now be described in greater detail hereinbelow, with particular reference to the accompanying Drawings. In the accompanying Drawings.

DESCRIPTION OF PREFERRED EMBODIMENT

Figure 1:
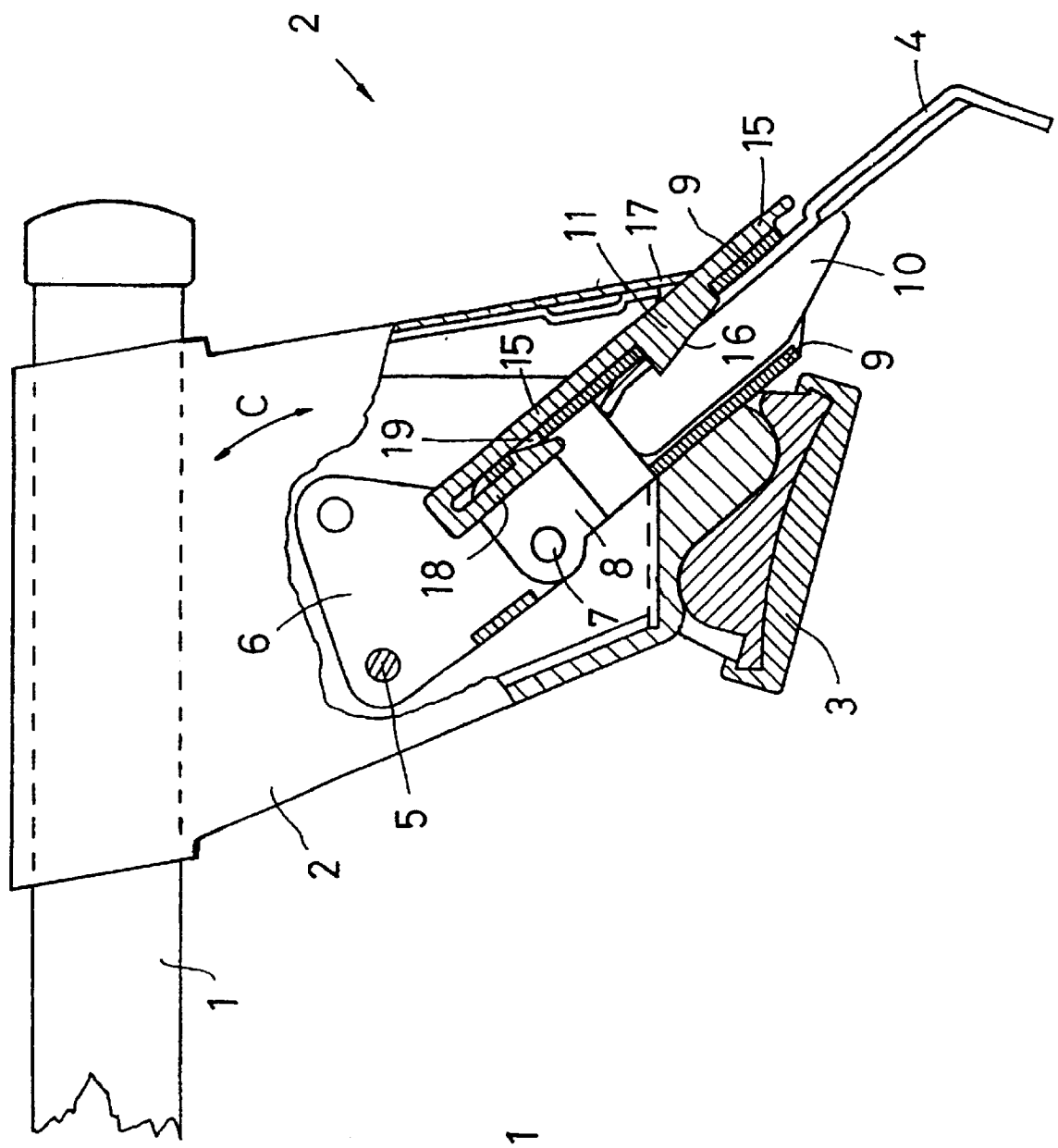
FIG. 1 is a partial cross section through a load carrier foot according to the invention.

Referring to the Drawings, reference numeral 1 in FIG. 1 relates to a load carrier strut which, in the mounted position on a vehicle, extends transversely over the vehicle roof. Reference numeral 2 relates to a load carrier foot which is intended to secure the load carrier strut to opposing side edge portions of the vehicle roof. In its lower end, the load carrier foot 2 has a support portion 3 which is intended to abut against the vehicle roof. The load carrier foot 2 may be displaceable along the load carrier strut 1 but those means which put into effect such movement do not form part of the present invention.

The load carrier foot 2 is further provided with a clamping member 4 which, by engaging with edge portions of the vehicle roof or with areas of the vehicle body located beneath the roof, or possibly with anchorages specifically provided for this purpose and mounted on the body, is intended to secure the load carrier on the vehicle. The movements which, to this end, the clamping member undergoes are composed of an upwardly directed movement towards the load carrier strut 1 and an inwardly directed movement (towards the longitudinal center line of the vehicle) in the longitudinal direction of the load carrier strut 1. The proportions between these components may vary in the movement diagram, and may also vary in response to the detail design of the load carrier foot 2. Taken as a whole, the clamping member 4 realizes an urging laterally towards the vehicle body while at the same time urging the support portions 3 against the vehicle roof.

For operating the clamping member 4, the load carrier foot 2 includes a clamping device whose detailed design and construction do not constitute any germane part of the present invention but which comprises a rocker 6 pivotal about a shaft 5 rigidly secured in the load carrier foot 2. In terms of movement, the rocker 6 is coupled to the clamping member 4, among other things by the intermediary of a stub shaft 7. On rotation of the rocker in a counterclockwise direction according to the arrow C from the open position illustrated in the FIG. 1, the lower portion of the clamping member 4 will move to the left at the same time as being lifted. This generates a clamping movement for the clamping member 4. On rotation in the opposite direction, the clamping member is released following a pattern of movement in the reverse order.

The rocker 6 which, in the illustrated version, may represent (or possibly be considered as constituting) a part of the clamping device, is pivotally connected via the above-disclosed stub shaft 7 to a retainer portion 8 which, in turn, is interconnected with the clamping member 4. To this end, the retainer portion 8 and the clamping member 4 are provided with mating connection pieces 9 and 10, respectively. In the interconnected position, the interconnection action itself is locked by a latch device 11.

Figure 3:
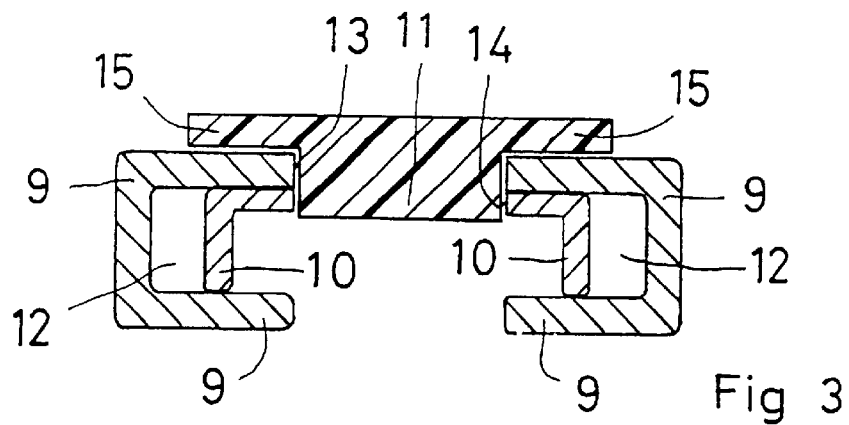
FIG. 3 is a cross section taken along the section marking 3—3 in FIG. 2.

It will be apparent from FIG. 3 (which shows a simplified cross section taken approximately along the section marking 3—A in FIG. 1), that the connection piece 9 of the retainer portion 8 is approximately C-shaped in cross section and defines an accommodation or insertion space 12 in which the connection piece 10 of the clamping member 4 is housed. In such instance, the clamping member 4 is insertable in its longitudinal direction with the connection piece 10 into the connection piece 9 on the retainer portion 8.

Alternatively, the connection piece 10 of the clamping member 4 may be designed so as to define an accommodation space in which the connection piece 9 of the retainer portion 8 is insertable.

Figure 2:
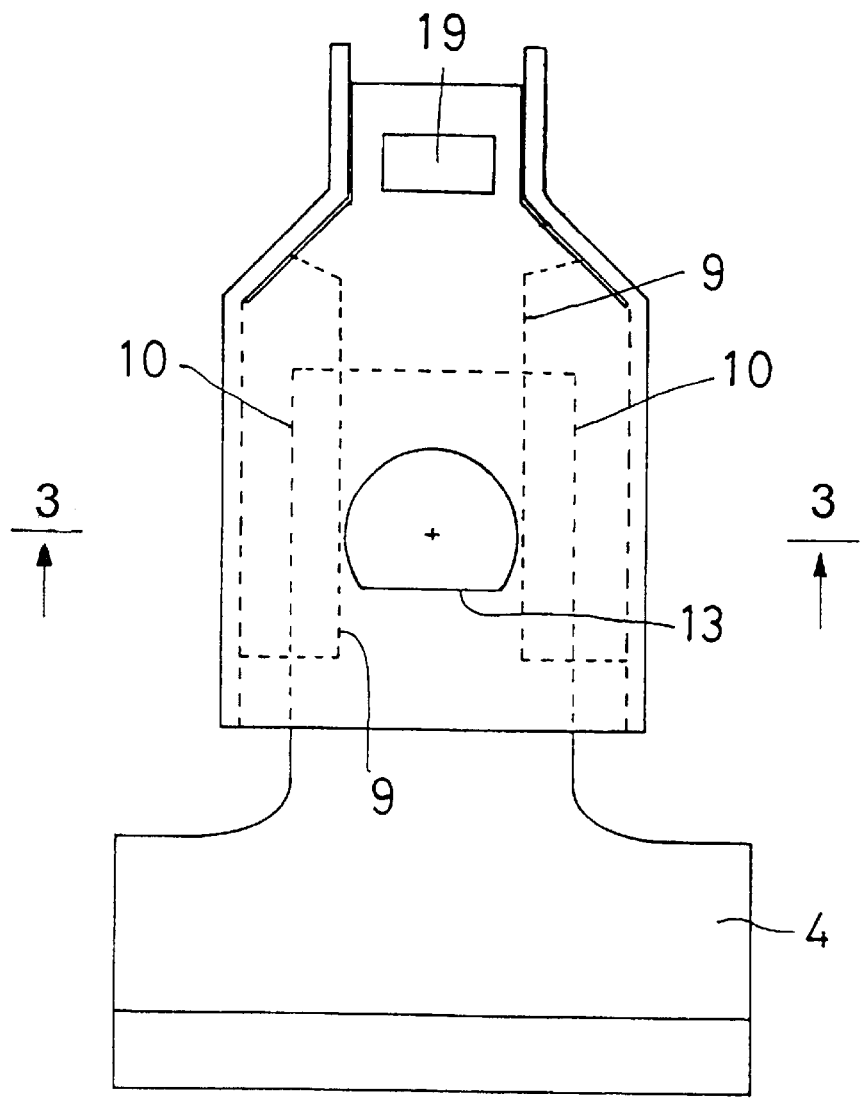
FIG. 2 is a separate view of the retainer portion and clamping member, seen in the direction of the arrow 2 in FIG. 1.

The interconnection of the clamping member 4 and the retainer portion 8 is such that no—or only insignificant—movement between them can take place in the clamping direction of the clamping member, i.e. in an upward and downward direction in FIGS. 2 and 3. On the other hand, the interconnection is conceived in such a manner that a limited pivotal capability is provided for the clamping member 4 in relation to the retainer portion 8 in a direction which is transverse to the longitudinal axis of the vehicle and which is thereby roughly normal to the approximate plane of extent of the clamping member 4. This pivotal capability is realized in that the latch device 11 is designed as a pin which extends through mutually covering apertures 13 and 14 in the retainer portion 8 and clamping member 4, respectively, in the interconnected state. This limited pivotal capability is illustrated in FIG. 2 by the double headed arrow D.

The latch device 11 is placed on an operating portion 15 which is made of a resilient material so that the latch device 11 is thereby pretensioned towards its latch position. In order, despite the pretensioning of the latch device 11, to permit a simple insertion of the clamping member 4 into the insertion or accommodation space 12 of the retainer portion 8, the latch device 11 is provided with an obliquely inclined ramp 16 which, on insertion of the clamping member 4, moves aside the locking device 11 until this snaps back into the aperture 14 of the clamping member 4. For release of the clamping member 4, it is sufficient that the operating portion 15 is grasped at its under edge and lifted or pivoted away from the retainer portion 8 so that the latch pin or device 11 releases its engagement in the aperture 14 of the clamping member 4.

In order to guarantee the correct pattern of movement for the clamping member 4 on its clamping movement, the load carrier foot 2 is provided with an abutment portion 17 against which the assembly of retainer portion/clamping member/operating portion is urged when the load carrier foot is clamped in place. This urging of the above-disclosed assembly entails that the operating portion 15 will come into abutment against the abutment portion 17 and be urged towards the locking position so that, in the fixedly clamped position on a vehicle roof, there will thereby no longer be any possibility of releasing the latch device 11 so that the clamping member 4 can consequently be removed.

Given that the retainer portion 8 and operating portion 15 mounted thereon will, on tightening of the load carrier foot, come into engagement against the abutment portion 17, both the retainer portion 8 and the operating portion 15 may be considered to be included as portion of the locking mechanism of the load carrier foot, together with the rocker 6. For fixing the operating portion 15 and the latch pin 11 mounted thereon onto the retainer portion 8, the operating portion 15 is provided with a section which extends along the connection piece 9 of the retainer portion 8 to its upper end, where the operating portion is provided with a recurved portion 18 which is designed for snapping the operating portion 15 into an aperture 19 in the upper end of the retainer portion 8. This implies that the operating portion 15 may readily be replaced in such situations as, for example, wear which may possibly be caused by the urging action against the abutment portion 17.

On tightening of the clamping mechanism for fixing the load carrier foot onto a vehicle, the engagement between the connection pieces 9 and 10 on the retainer portion 8 and clamping member 4, respectively, will transfer the moment of flexure to which the unit comprising the retainer portion and clamping member is exposed as a result of the horizontal component of clamping force (the component running in the longitudinal direction of the load carrier strut). A load carrier strut receiver then secures the load carrier strut to the load carrier foot where the load carrier strut is fastened upon the load carrier foot at the load carrier strut receiver. The force in the longitudinal direction of the unit comprising the retainer portion and clamping member will, on the other hand, substantially be absorbed by the latch pin 11. For this reason, the latch pin 11 is of considerable diameter in relation to the width of the connection piece 10 of the clamping member 4. Suitably, the latch pin 11 may have a diameter which amounts to the order of magnitude of half of the width of the connection piece 10.

The present invention may be modified without departing from the spirit and scope of the appended Claims.

What is claimed is:

1. A load carrier foot adapted for releasable securement upon an edge portion of a vehicle roof, said load carrier foot comprising:

a support member for abutment against a vehicle roof;

a clamping member coupled to said support member by a retainer member, said clamping member being operable between a clamping configuration and a released configuration upon an edge portion of a vehicle roof;

said clamping member having a first connection piece and said retainer member having a second connection piece for releasably interconnecting said clamping member and said retainer member wherein one of said connection pieces forms an insertion space and the other of said connection pieces forms an insertion member for insertion into said insertion space; and a latch device for releasably securing said insertion member within said insertion space for facilitating installation of different clamping members into said load carrier foot and said latch device being adapted for snapping engagement into a secured position for coupling together said retainer member and said clamping member.

2. The load carrier foot as recited in claim 1; wherein said latch device is spring-biased toward a secured position for coupling together said retainer member and said clamping member.

3. The load carrier foot as recited in claim 1; wherein said latch device further comprises a latch pin upon which said clamping member is pivotable relative to said retainer member.

4. The load carrier foot as recited in claim 1; wherein said second connection piece of said retainer member defines said insertion space and said first connection piece of said clamping member defines said insertion member.

5. The load carrier foot as recited in claim 4; further comprising:

said retainer member having a substantially C-shaped cross sectional shape interiorly defining said insertion space; and said first connection piece of said clamping member insertable longitudinally within said insertion space for relative longitudinal movement between said retainer member sand said clamping member until said latch device is engaged to prevent said relative longitudinal movement.

6. The load carrier foot as recited in claim 1; further comprising:

a first aperture extending through said clamping member and a second aperture extending through said retainer member; and said latch device extending through said first and second apertures in a latched configuration.

7. A load carrier foot adapted for releasable securement upon an edge portion of a vehicle roof, said load carrier foot comprising:

a support member for abutment against a vehicle roof;

a clamping member coupled to said support member by a retainer member, said clamping member being operable between a clamping configuration and a released configuration upon an edge portion of a vehicle roof;

said clamping member having a first connection piece and said retainer member having a second connection piece for releasably interconnecting said clamping member and said retainer member wherein one of said connection pieces forms an insertion space and the other of said connection pieces forms an insertion member for insertion into said insertion space;

a latch device for releasably securing said insertion member within said insertion space for facilitating installation of different clamping members into said load carrier foot; and said latch device being constructed from a resilient material and adapted for insertion into apertures formed in each of said retainer member and said clamping member for coupling together said retainer member and said clamping member.

* * * * *